United States Patent [19]

Marchisio et al.

[11] Patent Number: 4,690,659

[45] Date of Patent: Sep. 1, 1987

[54] TORSIONAL DAMPER DEVICE

[75] Inventors: Aldo Marchisio, Moncaelieri Turin; Carlo Beccaris, Santena Turin, both of Italy

[73] Assignee: Valeo, Paris, France

[21] Appl. No.: 726,889

[22] Filed: Apr. 24, 1985

[30] Foreign Application Priority Data

Apr. 27, 1984 [FR] France .................. 84 06717

[51] Int. Cl.$^4$ .................... F16D 3/14; F16D 13/64
[52] U.S. Cl. .................... 464/68; 192/106.2; 464/81
[58] Field of Search ........... 192/30 V, 70.17, 106.1, 192/106.2; 464/63, 64, 66, 68, 81, 84, 100, 101

[56] References Cited

U.S. PATENT DOCUMENTS

| | | | |
|---|---|---|---|
| 3,974,903 | 8/1976 | De Gennes | 192/106.2 |
| 4,301,907 | 11/1981 | Carpenter et al. | 464/68 X |
| 4,351,167 | 9/1982 | Hanke et al. | 464/24 |
| 4,471,863 | 9/1984 | Lech, Jr. | 464/68 X |

FOREIGN PATENT DOCUMENTS

| | | | |
|---|---|---|---|
| 2814059 | 10/1978 | Fed. Rep. of Germany | 192/106.2 |
| 1328276 | 4/1963 | France . | |
| 2197433 | 3/1974 | France . | |
| 2361574 | 3/1978 | France | 192/106.2 |
| 2381206 | 9/1978 | France . | |
| 2509402 | 1/1983 | France | 192/106.2 |
| 2521245 | 8/1983 | France . | |

Primary Examiner—Daniel P. Stodola
Attorney, Agent, or Firm—Young & Thompson

[57] ABSTRACT

A torsional damper device comprises a first coaxial part in the form of a hub flange formed with circumferential slots and a second coaxial part in the form of two guide rings disposed one on each side of the hub flange. Spacers passing through the slots fasten the guide rings together. Relative angular movement between the first and second coaxial parts is permitted within predetermined limits defined by cooperation of the spacers with lateral edges of the slots. Circumferentially acting elastic members are disposed between the first and second coaxial parts to urge them into an idle configuration. At least one elastic abutment member is carried by one of the coaxial parts and selectively deployable between one of the spacers and at least one of the lateral edges of the associated slot, in order to resist elastically abutment of the spacer against this edge.

5 Claims, 21 Drawing Figures

TORSIONAL DAMPER DEVICE

BACKGROUND OF THE INVENTION

1. Field of the Invention

The present invention is generally concerned with a torsional damper device of the kind comprising two coaxial parts disposed to rotate relative to one another about an idle relative angular configuration within predetermined limits of relative angular movement and circumferentially acting elastic means disposed between said parts along at least one circumference of the assembly so as to urge these parts elastically into their idle angular configuration.

The invention applies more particularly to torsional damper devices of the aforementioned type in which a first part comprises a hub flange and a second part comprises two guide rings disposed one on each side of said hub flange and linked together by spacers passing through said hub flange by means of circumferentially elongate oblong openings (notches or holes). These openings are delimited, as is known, by lateral flanks forming abutment members for limiting angular movement of the spacers and therefore of the hub flange.

The invention applies more particularly, but not exclusively, to damping torsional vibrations within a clutch disk, for automobile vehicles in particular. As is known, one of the coaxial parts, generally the hub flange, is then coupled, possibly with limited relative angular movement, to a hub mounted on a shaft known as the driven shaft, terminating at a gearbox, for example, whereas the other part, generally comprising the guide rings, carries at its periphery friction facings designed to be clamped selectively between two plates of a clutch.

As is known, the elastic means disposed between the two parts are more often than not in the form of helical springs of different stiffness disposed in the two coaxial parts so as to offer increasing resistance as the relative angular displacement between these parts increases.

2. Description of the Prior Art

A configuration of this kind is well known and is summarized, for example, in French Pat. Nos. 2 197 433 and 2 509 402. In known manner the friction members are disposed axially between the parts, for example in order to procure a "hysteresis" effect adapted to introduce differences in terms of behavior, for a given relative angular displacement, according to the direction in which this displacement is varying.

This arrangement of increasing stiffness elastic means is intended to procure appropriate filtering of torsional vibrations, both at low values of torque and when stopped, by virtue of the low stiffness elastic means, and at high values of torque, by virtue of the maximum stiffness elastic means.

However, it happens that in operation vibrations or sudden variations of the torque occur with an amplitude such that the aforementioned elastic means are incapable of absorbing them and preventing the occurrence of a sudden relative rotation between the two coaxial parts, which reaches the authorized limits of relative angular displacement. The spacers which link the guide rings then come sharply into abutment against the flanks of the associated openings in the hub flange, generating noise.

Apart from this disadvantageous noise, the abutting of the spacers against the associated flanks in this way causes mechanical damage to the damper device. Because of manufacturing tolerance in respect of the openings in the hub flange and the spacers, it is virtually inevitable that one of the spacers of the damper device will come into abutment engagement before the others. This results in highly localized wear and the risk of warping and eccentricity of the coaxial parts by virtue of the high values of off-center torque which arise transiently around the abutment area at the time of the impact.

SUMMARY OF THE INVENTION

The invention is intended to alleviate these disadvantages, both mechanical and audible, and to this end proposes a torsional damper device of the kind comprising two coaxial parts disposed to rotate relative to one another about an idle angular configuration within predetermined limits of relative angular displacement, namely a first part comprising a hub flange and a second part comprising two guide rings disposed one on each side of said hub flange and linked to one another by spacers passing through said hub flange by means of circumferential slots, these slots being delimited by lateral edges forming abutment members for limiting angular displacement of these spacers, this device further comprising circumferentially acting elastic means disposed between said parts along at least one circumference of the assembly, so as to urge them elastically into their idle configuration, being characterized in that an elastic abutment member, carried by one of the parts, is partially and selectively deployable between a spacer and at least one of the lateral edges of the associated slot, so as to resist elastically the abutment of the spacer against said edge.

The essential characteristic of the invention thus resides in the selective insertion between the spacers and the associated slot edges of the hub flange, in the plane of the hub flange or its near vicinity, of an elastic member for limiting the angular displacement between the two coaxial parts. The insertion characteristic is to be considered in a mechanical sense, the retractable character of the elastic abutment member resulting from the fact that, in practice, the respective points of contact between the spacers, the hub flange and the elastic abutment member are separate: in practice they are offset either axially or radially. It will be understood that the elastic abutment members in accordance with the invention, unlike rubber or elastomer sleeves or buffers associated with the spacers and/or the edges of the associated slots (which would occupy a volume which might on occasion be judged excessive, given the limited space available between the positions of the elastic means), by virtue of their retractable character, do not require any circumferential enlargement of the slots at the level of the spacers, which continues to favor the strength of the hub flange and a satisfactory disposition of the circumferentially acting elastic means.

In accordance with an advantageous specific characteristic of the invention, the elastic abutment members are flexible members, preferably of spring steel, carried by the hub flange or the guide rings, as required. Members of this kind, especially when they are in the form of a wire or sheet, are relatively compact. As to their attachment to the hub flange, they offer the advantage of not requiring any modification of the guide rings which generally constitute the most costly component parts of a torsional damper device, in particular in the case of a clutch disk. On the contrary, the attachment of such flexible members to the guide rings, requiring only a few holes to be bored in the latter, provides for good retention of these members in position, without any tilting relative to the hub flange.

Other objects and advantages will appear from the following description of examples of the invention, when considered in connection with the accompanying drawings, and the novel features will be particularly pointed out in the appended claims.

DESCRIPTION OF THE PREFERRED EMBODIMENTS

Figure 1:
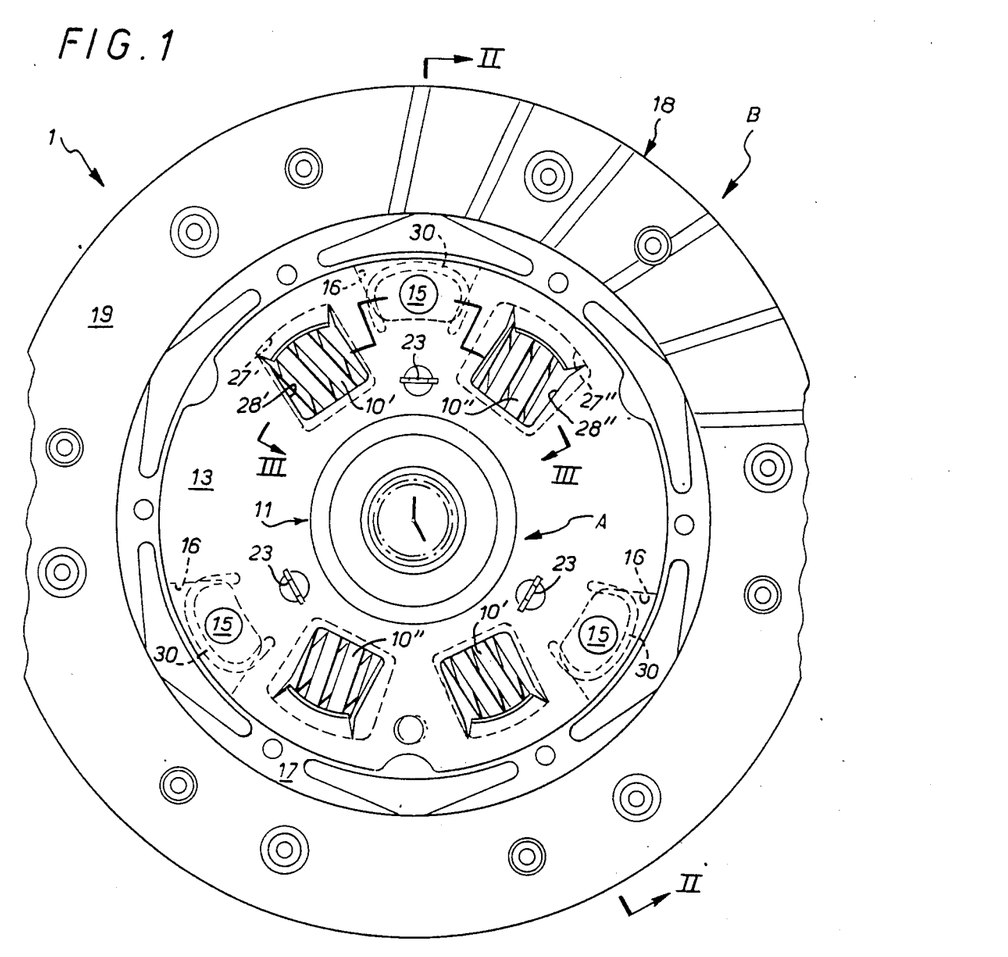
FIG. 1 is a partial view in elevation of a first embodiment of a torsional damper device in accordance with the invention.
Figure 2:
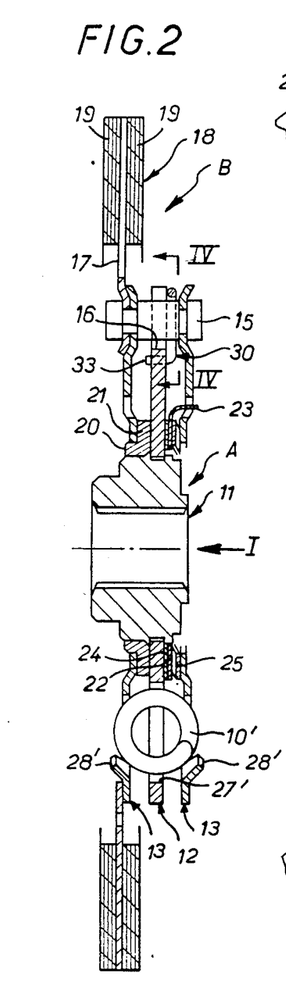
FIG. 2 is a view of it in axial cross-section on the broken line II—II in FIG. 1.
Figure 3:
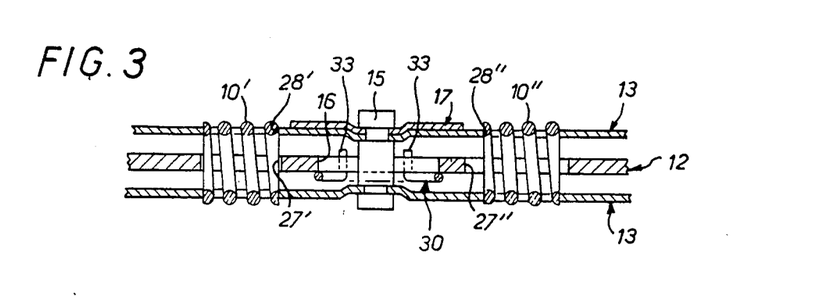
FIG. 3 is a partial view of it, developed in the flat, in circumferential cross-section on the broken line III—III in FIG. 1.

As shown in FIGS. 1 through 3, which show by way of example the application of the invention to the structure of a clutch disk for automobile vehicles, a torsional damper device 1 in accordance with the invention comprises, generally speaking and in a manner known per se, on the one hand two coaxial parts A and B disposed to rotate relative to one another within determined limits of relative angular displacement and, on the other hand, circumferentially acting elastic members disposed between these parts along at least one circumference of the device, one only in the example shown, so as to urge the parts elastically into an overall configuration referred to as the idle configuration (see FIG. 1).

In the embodiment shown the part A comprises a hub 11 which, internally splined in the example shown, is designed to be constrained to rotate with a shaft, in practice a driven shaft, and a hub flange 12 which is fastened to the hub 11, being crimped to the latter, for example and as shown here. As an alternative which is not shown, the hub flange is permitted a predetermined degree of relative angular displacement relative to the hub by being coupled to it through circumferentially acting elastic means, analogous to but smaller than the aforementioned members for elastically urging the parts A and B into their idle configuration.

In the embodiment shown, the part B comprises two guide rings 13 disposed one on each side of the hub flange 12, parallel thereto and spaced therefrom. They are fastened together by column members or spacers 15 which pass with clearance through slots 16 formed to this end near the periphery of said hub flange 12. As shown here, these slots are in the form of notches. As an alternative which is not shown, these slots may be holes formed in the hub flange.

The part B further comprises, attached by a flange 17 to one of the guide rings 13 and fastened to the latter by the same column members 15 as fasten together the guide rings 13, a friction disk 18 which is designed to be clamped axially, by means of its friction facings 19, between two plates of a clutch constrained to rotate with a shaft, in practice a driving shaft.

On the side of the hub flange 12 facing the friction disk 18 there is disposed between the corresponding guide ring 13 and the flange 17 of said friction disk 18, on the one hand, and the hub 11 of the part A, on the other hand, an axial bearing 20 to which is fastened a radial flange 21 inserted axially between said flange 17 of the friction disk 18 and said hub flange 12.

On the side of the hub flange 12 facing towards the other guide ring 13 there are axially inserted, on the one hand, an operating ring 22 which, constrained to rotate with said guide ring 13 by axial lugs 23, carries a friction facing 24 in contact with the hub flange 12 and, on the other hand, between said operating ring and said guide ring 13, an axially acting elastic ring 25 of the corrugated type, for example and as shown here, commercially available under the trade name "ONDUFLEX".

These arrangements are well known per se and as they do not constitute part of the present invention they will not be described in more detail here.

In a manner also known per se the elastic members for urging the parts A and B into their idle configuration consist of a plurality of groups of springs 10' and 10" of different stiffness.

In the embodiment shown, there are two springs 10' diaposed at substantially diametrically opposed positions. In this embodiment, the springs 10", also two in number, are disposed in substantially diametrically opposed positions, alternately with the preceding springs; their stiffness is higher than that of the springs 10'.

Each of the springs 10' or 10" is accommodated in part in a housing 27' or 27" formed to this end in the driven part A (in practice an opening formed in the hub flange 12) and in part in housings 28' or 28" also formed to this end in the driven part B (in practice openings formed in the guide rings 13 and in the flange 17 of the friction disk 18).

In the idle configuration of the assembly shown in FIG. 1, all of the springs 10' and 10" are disposed without circumferential clearance in the housings 28' and 28" in the driving part B. Likewise the springs 10' are disposed without circumferential clearance in their housings 27' in the part A. On the other hand, the springs 10" have circumferential clearance relative to their housings 27', in one circumferential direction at least; in the example shown there is clearance in both directions.

As a result, when the parts A and B are subject to relative rotation, during a first stage only the springs 10' oppose this, until the circumferential clearances between the springs 10" and the associated housings 27" formed in the hub flange are absorbed. It is only during a second stage, after these clearances are absorbed, for greater relative rotations between the parts A and B, that the springs 10", of greater stiffness that the springs 10', in turn come into play. Thus the torsional damper device of FIGS. 1 through 3 comprises two stages of different stiffness. The number of groups of springs is naturally not limited to two. The provision of these various stiffness stages, not constituting part of the invention, will not be described in more detail. For further details reference should be had to the aforementioned prior art patents.

In accordance with the invention the aforementioned torsional damper device comprises an elastic abutment member which is carried by one of the parts A and B, being at least partially selectively inserted between a column member or spacer 15 and one at least of the edges 16a of the associated slot 16 formed in the hub flange, so as to resist elastically abutment of the spacer against said edge.

In the embodiment shown in FIGS. 1 through 5, the torsional damper device 1 comprises an elastic member for each slot or notch 16 in the hub flange 12. This elastic member consists of a wire, preferably metallic and of spring steel, for example, in the shape of an arch or fork 30. This arch comprises a median section 31 and two sides 32 the ends 33 of which are bent at 90° perpendicularly to the plane of the arch.

As shown here by way of example, the arch 30 is fixed to the hub flange 12 by means of holes 34 radially short of the column members adapted to receive the bent ends 33 of said arch and its median section 31 extends externally around the column member 15, that is to say on the same side as the friction facings.

The substantially radial sides 32 of the arch-shaped wire extend along the edge 16a of the slots 16 associated with the column member in question, encroaching circumferentially into this opening, in a retractable manner; they define, on a circumference of the hub flange passing through the column members 15, an arch which is slightly smaller than that defined by the edges 16a of the slot 16. As a result, and as is clearly seen in FIG. 4, the column member 15 enters into abutment contact with these sides 32 at a circumferential distance J from the edges 16a of the slot 16 in the event of great relative displacement between parts A and B. The retractable arch 30 thus constitutes a supplementary stiffness stage, operative by flexing, which tends to oppose the abutment of the spacer 15 against the edges 16a in question. In the example shown, the two sides 32 define relative to the edges 16a circumferential elastic clearances J which are equal. Alternatively, these elastic clearances may be different.

Figure 4:
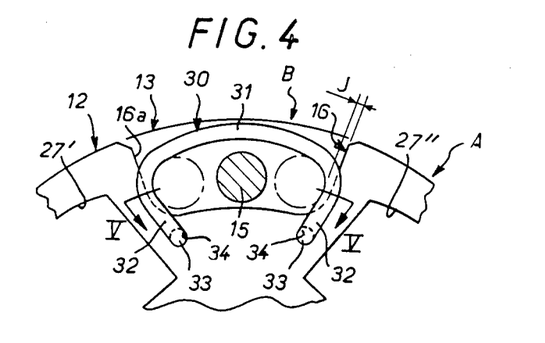
FIG. 4 is a simplified partial view to a larger scale in cross-section on the line IV—IV in FIG. 2.

The arch 30 is disposed in a transverse plane which is near but offset axially relative to that of the hub flange 12 (whence its retractable character), so that the sides 32 are not strictly speaking disposed between the column member 15 and the edges 16a: for this reason this expression must be understood in a very general sense in the present context. Note that the arch 30 is disposed in the dead space usually found between the hub flange and the ring, thanks to which, as indicated above, its provision in accordance with the invention has only a minimal effect on the strength characteristics of the hub flange and the disposition of the members 10 and 10', while providing for retraction of said arch.

As shown the bent ends 33 of the arch 30 are parallel to the axis of the damper device and pass through the hub flange by virtue of the aforementioned holes 34.

Figure 5:
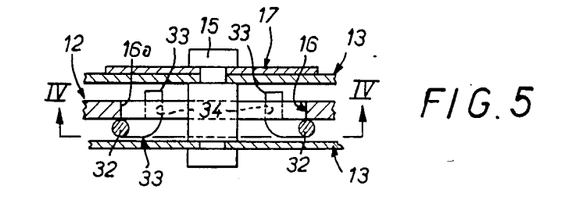
FIG. 5 is a simplified cross-section on the curved line V—V in FIG. 4.

As seen in FIGS. 2 and 5, the arch is axially disposed between the hub flange 12 and one of the guide rings 13 with sufficiently small axial clearance (less than the distance to which said ends penetrate into the holes) for the ends 33 to be prevented from escaping from the holes 34. As an alternative which is not shown these ends are fastened axially to the hub flange, by being bent back, for example, but this is not essential.

It should be noted that the fastening methods which have just been described are in no way sensitive to centrifugal forces, so that there is no risk of these forces causing unwanted releasing of the arch. Note also that, because it extends around the outside of the column member 15, the arch 30 offers the advantage that its median section 31, in tending to move centrifugally away from the axis, tends to move closer towards the column member abutment areas which the sides 32 feature, so increasing the elastic clearance J.

Figure 6:
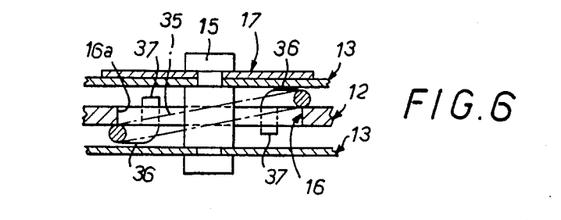
FIG. 6 is a view analogous to FIG. 5 of an alternative embodiment.

FIG. 6 shows an alternative arch 35 in which the sides 36 extend along both edges 16a of the slot, on different sides of the hub flange 12. The bent ends 37 are directed in opposite directions, which confers great security with regard to the fitting of the arch 35 to the hub flange 12.

FIGS. 7 through 10 illustrate further variations with regard to its fastening to the hub flange 12 in the case of an arch 40 the ends 41 of which are curved in the plane of the arch, so as to form loops adapted to be engaged axially over studs mounted on the hub flange radially short of the column members.

Figures 7, 8, 9, 10:
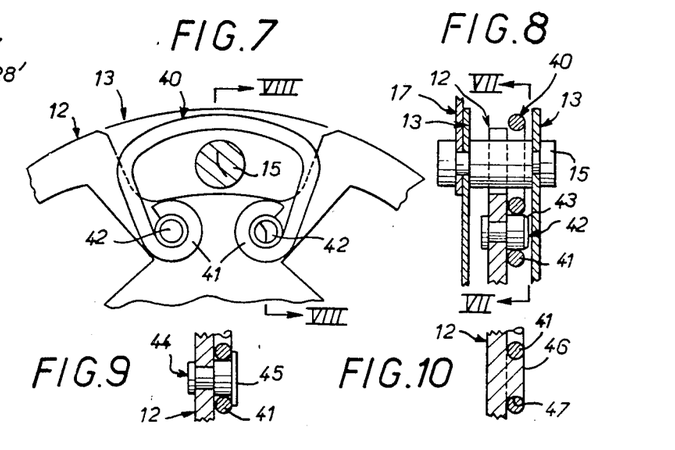
FIG. 7 is a simplified partial view analogous to FIG. 4 of another embodiment of the invention.
FIG. 8 is a cross-section of it on the broken line VIII—VIII in FIG. 7.
FIG. 9 is a detail view in cross-section of a variation on FIG. 8.
FIG. 10 is a view analogous to FIG. 9 of a further embodiment.

FIGS. 7 and 8 show studs 42 consisting of rivets with a cylindrical head 43. The length of these heads is such that, even if the arch 40 abuts axially against the facing guide ring 13, said arch cannot become disengaged from the rivets 42: the length of these heads is greater than the clearance with which the arch is mounted between the hub flange and the guide ring.

FIG. 9 shows a stud 44 consisting of a rivet with a shouldered head 45, whereby the arch is fixed more securely against the hub flange 12.

Finally, FIG. 10 shows a stud 46 in one piece with the hub flange 12 and featuring on its perimeter a groove 47 adapted to receive the end 41 of the arch 40 which must then be shaped into a loop in situ. In a variation which is not shown the studs on which the ends 41 of an arch are engaged are rivets the head of which features an annular groove analogous to the aforementioned groove 47.

Figure 11:
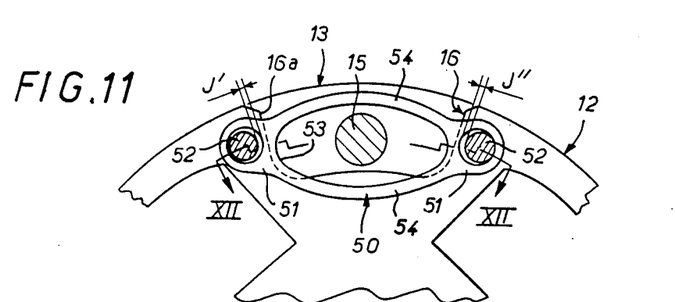
FIG. 11 is a simplified partial view to a larger scale, analogous to FIG. 4, of a further embodiment of the invention.
Figure 12:
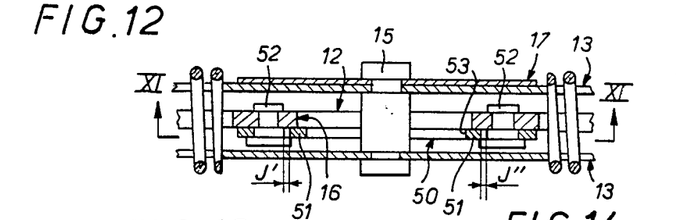
FIG. 12 is a view of it in cross-section on the broken line XII—XII in FIG. 11.

FIGS. 11 and 12 show an elastic abutment member 50 cut out from a sheet, of spring steel, for example. This member 50 is the shape of a circumferentially elongate loop adapted to surround the column member 15 and features at its opposite ends 53 eyelets 51 adapted to be engaged with clearance over studs 52 on the hub flange 12, disposed near the edges 16a, preferably substantially on the circumference on which the column members 15 are situated. As previously, the opposed lateral sections 53 encroach on the path of circumferential displacement of the associated spacer or column member 15 authorized by the edges 16a of a slot 16.

The elastic character of the member 50 results from the flexibility of the circumferentially elongate branches 54 extending around the column member.

The studs 52 mounted on the hub flange are of any type, analogous to the studs of FIGS. 7 through 10, for example.

The member 50 is mounted on these studs 52 by means of its eyelets 51 in a stretched condition such that the clearances J' and J" existing between these studs and these eyelets are both situated between the studs and the slot 16 which the latter bracket.

When the column member 15 moves towards an edge 16a of the associated slot, it first abuts against a section 53 of the elastic loop of the member 50 and tends to stretch the latter still further; there results supplementary flexing of the branches 54 to which the latter tend to oppose themselves. The section 53 against which the column member 15 abuts may thus be displaced, against the elastic return force from the branches 54, until the clearance J' or J" is completely taken up, being then located on the other side of the stud in question.

As shown in FIG. 11, the flexible branches 54 are of substantially constant cross-section. As an alternative, which is not shown, the cross-section varies along the length of these branches.

Figure 13:
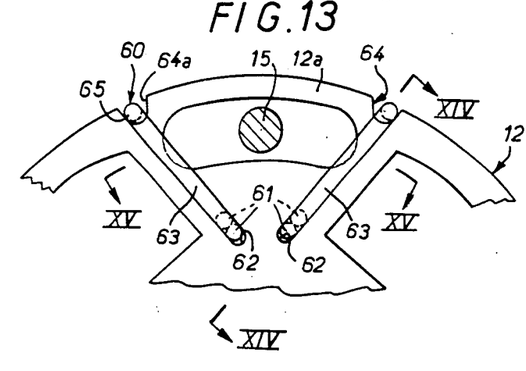
FIG. 13 is a view analogous to FIG. 4 relating to a further embodiment of the invention.
Figure 14:
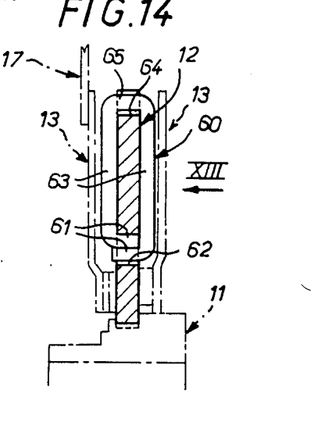
FIG. 14 is a view of it in cross-section on the line XIV—XIV in FIG. 13.
Figure 15:
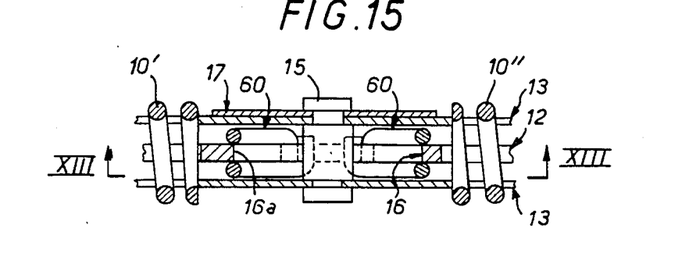
FIG. 15 is a view of it in cross-section on the curved line XV—XV in FIG. 13.

In the embodiment shown in FIGS. 13 through 15, with each edge 16a of a slot 16 there is associated an elastic abutment member 60 consisting in this instance of a wire shaped into a loop, the ends 61 of which are bent at 90° in the plane of the loop for the purpose of fixing it to the hub flange 12. These parallel ends 61 are advantageously juxtaposed, whereby a single hole 62 is sufficient for fixing them to the hub flange 12 and the branches 63 of the loop 60 are also of lengths which are as nearly the same as possible.

The fastening of a loop 60 to the hub flange 12 requires two fixing areas. In the example shown the hub flange 12 comprises, in addition to a hole 62 for each loop, a notch 64 situated at its periphery designed to receive the median part 65 of the loop.

Note that when a column member 15 moves towards an edge 16a it first abuts simultaneously, or nearly so, against the two branches 63 of a loop 60, which results in a high resistance opposing further moving together of the column member and the edge of the associated slot.

It should be noted that because the loop 60 is disposed circumferentially between a column member 15 and one of the associated edges 16a, the associated notch 64 is very near this edge. This notch comprises an edge 64a on the side of the slot 16, so as to prevent the loop escaping. To confer on the edges 64a associated with the same slot sufficient rigidity, these edges are in an advantageous but not essential manner linked by a circumferential strip 12a of the hub flange which closes off the slot 16 so as to form a closed hole rather than an open notch.

Figure 16:
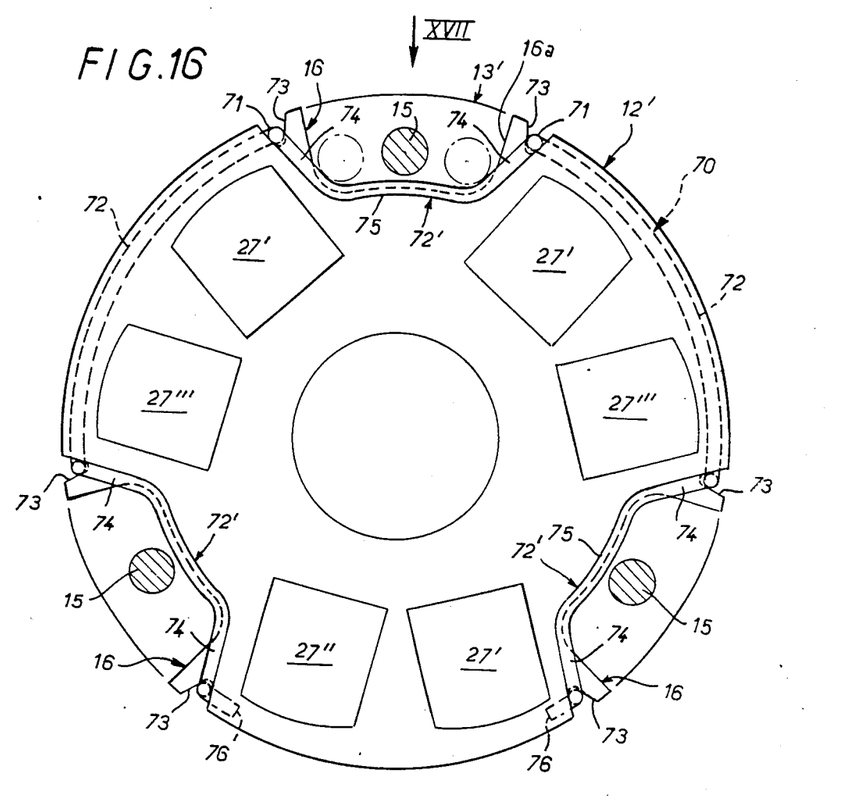
FIG. 16 is a partial view analogous to FIG. 4 of a further embodiment, showing the hub flange in its entirety.
Figure 17:
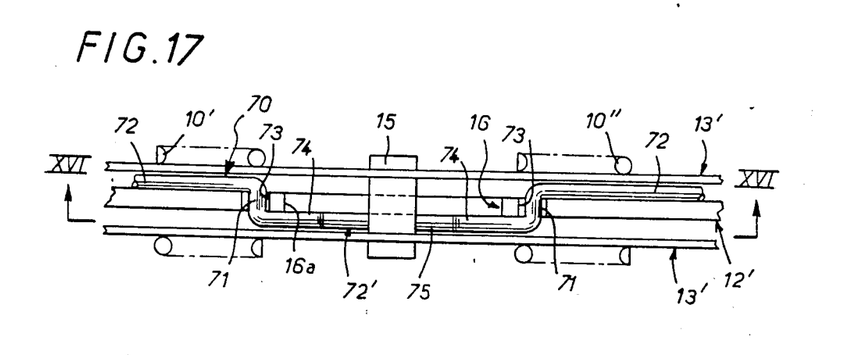
FIG. 17 is a radial partial view of it in the direction of the arrow XVII in FIG. 16.
Figure 18:
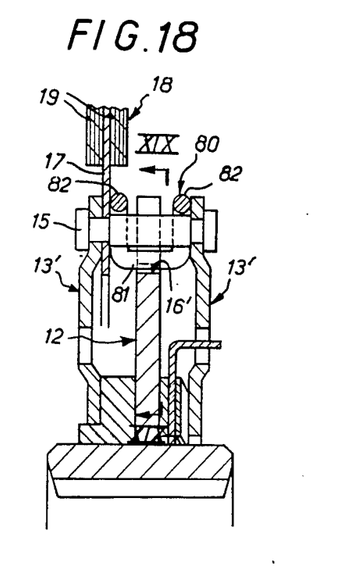
FIG. 18 is a half-view in axial cross-section of a further embodiment of torsional damper device in accordance with the invention on the line XVIII—XVIII in FIG. 19.

FIGS. 16 and 17 are partial representations of a torsional damper device comprising a single elastic abutment member 70. This consists of a wire shaped so as to be able to extend along the periphery of the hub flange 12' and the slots 16 which are formed in it for the column members 15 to pass through.

This member 70 extends along the hub flange on alternate sides, whereby it is coupled to it in the axial direction. The axial parts 71 of this member, linking its alternating circumferential parts 72 and 72', pass through the perimeter of the hub flange by means of notches 73 which prevent the member 70 rotating relative to the hub flange.

In the example shown in FIGS. 16 and 17 there is one notch 73 for each edge 16a of each slot 16 in the hub flange. It will be seen that these notches 73, somewhat similar to the notches 64 in FIGS. 13 through 15, are not linked by any circumferential strip and that the slots 16 in FIGS. 16 and 17 are notches rather than holes.

It should be noted that the hub flange 12' shown in FIG. 16 comprises six holes 27', 27", 27'", that is two more than the hub flange 12 of FIG. 1; this hub flange provides for the use of three pairs of springs of differing stiffness. Likewise the associated guide rings 13' comprise three pairs of holes.

Unlike the members 30, 35 and 40 in FIGS. 1 through 10, the elastic abutment member 70 extends around the column members 15 on the side towards the axis of the assembly. To this end it comprises for each slot 16 circumferential portions 72' featuring sections 74 for the column members 15 to bear on, linked by a portion 75 extending around these column members 15.

The member 70 comprises, linked to two axial parts, two short end parts 76 which extend circumferentially along the perimeter of the hub flange, between the slots 16.

FIGS. 18 through 21 illustrate a further embodiment which is principally distinguished from the preceding ones by the fact that the elastic abutment members 80 are mounted on the guide rings 13', as a result of which they are securely oriented relative to the plane of the hub flange 12.

As shown by way of example these members 80 are flexible, more precisely being fabricated from metal wire, there being one member per spacer 15. These members 80 are shaped so as to comprise an axial section 81 adapted to abut against one or other of the flanks of the hub flange, also shaped appropriately.

Each member 80 comprises two parallel transverse portions 82 wound with clearance on a column member 15 (over slightly less than one turn in the example shown) and symmetrical relative to the plane of the hub flange 12. These wound portions 82 are linked, on the one hand, to the axial section 81 and, on the other hand, to two axial end sections 83 which are aligned with one another, in opposite directions, and designed to be engaged in holes 84 in the guide rings 13'. For the purpose of their abutment engagement with the axial section 81 before the column member 15, for both directions of angular displacement, the slots 16' in the hub flange through which the members 80 pass advantageously have sloping edges featuring, circumferentially opposite the axial section 81, advanced edges 16'b nearer together than the remainder of the edges 16'a adapted to have the column members abut on them. In the example shown, given the location selected for the holes 84 for receiving the end sections 83 of the member 80 and the resultant position of the axial section 81, substantially at the same distance from the axis as these end sections, these advanced edges 16'b are disposed near the bottom 16'c of the slots 16'.

As previously, the members 80 are essentially located in the empty space between the hub flange and the guide rings and require no circumferential elongation of the slots 16'. The elastic character of these members results from the wound portions which open or close by flexing. As an alternative which is not shown these portions are wound around the column members by more than one turn. It should be noted that the retractable character of the members 80 results from the fact that the points of contact between the flanks and the column members or the axial sections 81 are in this instance offset in the radial direction.

Figure 19:
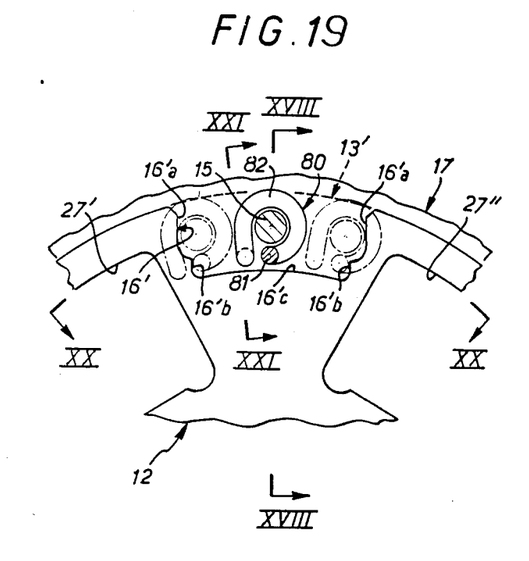
FIG. 19 is a simplified partial view of it, analogous to FIG. 4, on the line XIX—XIX in FIGS. 18 and 20.
Figure 20:
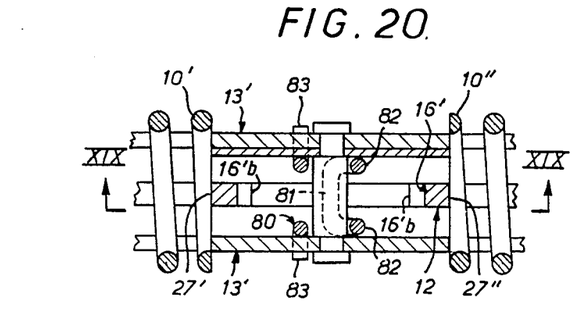
FIG. 20 is a partial view of it in circumferential cross-section on the curved line XX—XX in FIG. 19, developed in the flat.
Figure 21:
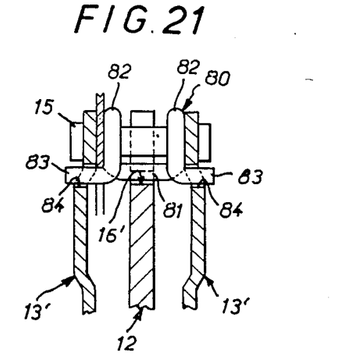
FIG. 21 is a partial view of it in cross-section on the line XXI—XXI in FIG. 19.

It will be noted that in practice the axial section 81 is preferably, in the idle configuration, in the same axial plane as the associated column member and that the advanced edges 16'b of the corresponding slot 16' feature similar but opposite angular offsets relative to the remainder of the edges 16'a adapted to have the column members abut on them.

As an alternative which is not shown the axial section is offset circumferentially relative to the associated column member and fulfills and elastic abutment member function only in relation to one lateral edge of the associated slot. According to another alternative each member is fixed by loops engaged over axial studs carried by the guide rings.

It will be understood that various changes in the details, materials and arrangements of parts which have been herein described and illustrated in order to explain the nature of the invention may be made by those skilled in the art within the principle and scope of the invention as expressed in the appended claims.

Thus the invention is equally applicable to the case of slots 16 in the form of holes as to the case of notches. The number of these slots is not limited to three, although this number is generally considered to be the optimum.

Futhermore, the exact shape or structure of the elastic abutment members is subject to considerable variation. In particular, the elastic wire from which they are fabricated, where appropriate, is preferably of round cross-section, but this is not essential.

It should furthermore be noted that, in the examples offered, it is recommended that elastic abutment members are disposed between each spacer or column member and each of the substantially radial edges of the associated slot, but this is not at all essential. Also, it is within the competence of the man skilled in the art, should he require it, to adjust the manufacture and shape of the elastic abutment members so that they oppose different resistances according to whether the column members tend to come into abutment with them in one direction or the other, against one edge or the other of the associated slot. The shape of the edges may be generally rectilinear as in the examples shown, or strongly curved, in particular in the case of slots in the form of holes rather than notches; in other terms, these edges are the circumferential ends of the slots.

There is claimed:

1. Torsional damper device comprising a first coaxial part in the form of a hub flange formed with circumferential slots, a second coaxial part in the form of two guide rings disposed one on each side of said hub flange and spacers passing through said slots and fastening said guide rings together, means for permitting relative angular movement between said first and second coaxial parts within predetermined limits of relative angular movement defined by abutment of said spacers with lateral edges of said slots, circumferentially acting elastic means disposed between said first and second coaxial parts along at least one circumference of the device urging them into an idle angular configuration and at least one elastic cushion member carried by one of said coaxial parts and operatively disposed circumferentially between one of said spacers and at least one of the lateral edges of the associated slot but off set from the zone of abutment of said one spacer with said at least one lateral edge to cushion elastically the abutment of said spacer against said edge, said at least one elastic cushion member being on said hub flange, there being a respective elastic cushion member associated with each slot in said hub flange, said elastic cushion member being an arch-shaped wire disposed in a plane parallel to the plane of said hub flange with each of its sides lying along a lateral edge of said slot.

2. Torsional damper device comprising a first coaxial part in the form of a hub flange formed with circumferential slots, a second coaxial part in the form of two guide rings disposed one on each side of said hub flange and spacers passing through said slots and fastening said guide rings together, means for permitting relative angular movement between said first and second coaxial parts within predetermined limits of relative angular movement defined by abutment of said spacers with lateral edges of said slots, circumferentially acting elastic means disposed between said first and second coaxial parts along at least one circumference of the device urging them into an idle angular configuration and at least one elastic cushion member carried by one of said coaxial parts and operatively disposed circumferentially between one of said spacers and at least one of the lateral edges of the associated slot but offset from the zone of abutment of said one spacer with said at least one lateral edge to cushion elastically the abutment of said spacer against said edge, said at least one elastic cushion member being on said hub flange, there being a respective elastic cushion member associated with each lateral edge of a slot in said hub flange, each of said elastic cushion members comprising a loop having two legs disposed along a common lateral edge on each side of said hub flange and fastened to said hub flange at the ends of its legs, which are bent in order to pass through at least one hole in said hub flange, and at its axially median part which is locked in position by a notch in said hub flange.

3. Torsional damper device comprising a first coaxial part in the form of a hub flange formed with circumferential slots, a second coaxial part in the form of two guide rings disposed one on each side of said hub flange and spacers passing through said slots and fastening said guide rings together, means for permitting relative angular movement between said first and second coaxial parts within predetermined limits of relative angular movement defined by abutment of said spacers with lateral edges of said slots, circumferentially acting elastic means disposed between said first and second coaxial parts along at least one circumference of the device urging them into an idle angular configuration and at least one elastic cushion member carried by one of said coaxial parts and operatively disposed circumferentially between one of said spacers and at least one of the lateral edges of the associated slot but offset from the zone of abutment of said one spacer with said at least one lateral edge to cushion elastically the abutment of said spacer against said edge, said at least one elastic cushion member being on said hub flange, there being a respective elastic cushion member associated with each slot in said hub flange, said elastic cushion member associated with a slot being a circumferentially elongate flexible elastic loop around the associated spacer and having at its ends eyelets by means of which it is mounted with clearance on studs fastened to said hub flange near the lateral edges of said slot.

4. Torsional damper device comprising a first coaxial part in the form of a hub flange formed with circumferential slots, a second coaxial part in the form of two guide rings disposed one on each side of said hub flange and spacers passing through said slots and fastening said guide rings together, means for permitting relative angular movement between said first and second coaxial parts within predetermined limits of relative angular movement defined by abutment of said spacers with lateral edges of said slots, circumferentially acting elastic means disposed between said first and second coaxial parts along at least one circumference of the device urging them into an idle angular configuration and at least one elastic cushion member carried by one of said coaxial parts and operatively disposed circumferentially between one of said spacers and at least one of the lateral edges of the associated slot but offset from the zone of abutment of said one spacer with said at least one lateral edge to cushion elastically the abutment of said spacer against said edge, said at least one elastic cushion member being on said hub flange, there being one elastic cushion member associated with all of said slots in said hub flange, said elastic cushion member being a wire having first circumferential portions lying along the periphery of said hub flange, on one side thereof, second circumferential portions lying along said slots in said hub flange, on the other side thereof, and axial sections which link said circumferential sections and pass through notches in said hub flange.

5. Device according to claim 4 wherein said elastic cushion member has two ends which lie along the circumferential periphery of said hub flange.

* * * * *